United States Patent [19]
Shea

[11] Patent Number: 5,202,189
[45] Date of Patent: Apr. 13, 1993

[54] FIRE-RESISTANT REINFORCED PLASTIC MATERIAL AND ARTICLES AND METHODS FOR THEIR MANUFACTURE BASED ON RESORCINOL NOVOLACS

[76] Inventor: Lawrence E. Shea, P.O. Box 1236, San Bruno, Calif. 94066-0760

[21] Appl. No.: 310,399

[22] Filed: Feb. 13, 1989

Related U.S. Application Data

[63] Continuation of Ser. No. 92,892, Sep. 4, 1987, abandoned, which is a continuation-in-part of Ser. No. 79,676, Jul. 30, 1987, abandoned.

[51] Int. Cl.$^5$ .................... C08G 8/28; C08F 283/00; B32B 17/10; B32B 27/42
[52] U.S. Cl. .................... 428/436; 428/524; 524/541; 524/594; 524/876; 427/385.5; 525/491
[58] Field of Search .............. 524/876, 541, 594; 525/491; 428/524, 436; 427/385.5

[56] References Cited

U.S. PATENT DOCUMENTS

| | | | |
|---|---|---|---|
| 2,424,787 | 7/1947 | Adams | 524/596 |
| 2,432,544 | 12/1947 | Rhodes | 524/541 |
| 2,488,428 | 11/1949 | Nagel | 524/541 |
| 4,105,623 | 8/1978 | Shannon et al. | 524/876 |
| 4,182,696 | 1/1980 | Wynstra et al. | 524/876 |
| 4,403,066 | 9/1983 | Brode et al. | 524/876 |
| 4,471,089 | 9/1984 | McAllister et al. | 524/876 |

Primary Examiner—Robert E. Sellers
Assistant Examiner—Frederick Krass
Attorney, Agent, or Firm—Owen, Wickersham & Erickson

[57] ABSTRACT

The specification discloses fire retardant composites which are curable at ambient temperatures and based on resorcinol-formaldehyde resins having specified molar ratios of phenol and aldehyde and specific viscosities.

35 Claims, No Drawings

FIRE-RESISTANT REINFORCED PLASTIC MATERIAL AND ARTICLES AND METHODS FOR THEIR MANUFACTURE BASED ON RESORCINOL NOVOLACS

REFERENCE TO RELATED APPLICATION

This application is a continuation of application Ser. No. 092,892, filed Sep. 4, 1987, now abandoned which was a continuation-in-part of application Ser. No. 079,676, filed Jul. 30, 1987, now abandoned.

This invention relates to improvements in fire-resistant materials made from fibers and plastics, to articles made therefrom, and to methods for making them.

BACKGROUND OF THE INVENTION

The present invention may be considered an improvement over my earlier U.S. Pat. No. 4,107,127. The invention described there related to resins and glass-fiber-reinforced ducts and other articles made therefrom. The resins were products made from resorcinol and formaldehyde, and in some instances incorporating phenol.

There are advantages to using resins that have a higher percentage of solids than was present in my earlier invention. Typically, in U.S. Pat. No. 4,107,127 the resin had about 42% solids; the non-volatiles could be raised up to slightly over 64% solids, but not beyond that.

There are advantages, however, in having solids contents from the mid-60%'s to the lower 80%'s. The problem with having such higher solids content has been that such resins tended to be too viscous, and their application to the fibers became difficult or inconsistent. Particularly, when working with such fibrous materials as glass fibers and glass fiber cloth, the glass did not tend to wet out properly when high-solids-content resins were used. It is generally not desirable to obtain higher solids content simply by adding fillers, but whether the resin itself has high solids content or fillers are added, the problem is there is too high a viscosity for the product to be of practical use.

In the earlier patent and in products made in further developing the patented invention, higher solids content was achieved by reacting the components to produce a polymeric syrup having around 64%-83% non-volatiles or solids. However the viscosity of such a syrup was about 1,000 to 3,000 centipoises. These high viscosities made it difficult to use the resultant resin for wetting out or saturating glass fiber materials, especially when paraformaldehyde (the then preferred aldehyde), was used alone as the source of the additional formaldehyde needed for room temperature cure. This problem occurred particularly in the use of filament winding roving, where a resin bath container was filled with the resin mixture and glass strands were drawn through the resin mix to wet each strand with the resin. The strands were then drawn onto a rotating mandrel or tool which might be of various shapes, including round, square, and rectangular. The viscosity of the liquid and the velocity of the strands through the resin mix created a back pressure or pull on the glass strands which tended to be so large that it exceeded the tensile strength of the strands, and the strands broke. Thus, it became difficult, if not impossible, to create a finished product from such strands. When fillers of various sorts were added to resin mixes to provide even higher solids content, in order to compensate for the shrinkage of the resin mix as the volatiles evaporated, those fillers compounded the difficulties by further increasing the viscosity of the resin mix.

Thus, it is an object of the present invention to provide a fiber-and-resin material and articles made therefrom which have high solids content but also have workable viscosities at the time of manufacture and, in addition, impart to the finished material high flame resistance and low smoke evolution.

Another object of the invention is to provide a method which enables practical application of these high solids content, fire-resistant materials.

Another object of the invention is to provide a way of reducing the viscosity of the fire-resistant resins during manufacture of fiber-reinforced sheets and shapes without unduly lowering the solids content, so that desirable products can be produced.

SUMMARY OF THE INVENTION

According to the present invention, suitable binders, with a high percentage of solids, can be produced from condensation products of resorcinol (with or without phenol as a co-reactant) and formaldehyde or paraformaldehyde, or both, in the alkaline state and in the presence of water. This new resin may be combined with various fiber products such as, but not limited to, random mat, "C"-veil, organic veils, woven roving, and filament winding or chopper roving. The fibers may be made from glass, carbon, or graphite fibers, or other such fire-resistant fibers, and achieve an end product which is exceptionally fire resistant and exceptionally low in any tendency to produce smoke. The resin may or may not contain fillers of various sorts.

Formaldehyde is present in the resin at a novolac mol ratio, i.e., sufficient to provide a substantially equivalent amount with respect to the phenolic hydroxyl radicals available, but less than 1 mol ratio. The principal components and conditions are parallel to those reported in my earlier U.S. Pat. No. 4,107,127, but act to extend the ranges of the materials, so that resin compositions of higher solids content including higher weight percentages of resorcinol may be used.

In the present method, there are two applications of formaldehyde to achieve the needed mixture of formaldehyde with the resorcinol or phenol/resorcinol. An initial amount is used to make the polymeric syrup and then, later and as an additional step, a different mixture of formaldehyde is used.

This may be done while also adding a viscosity-reducing solvent, or the solvent may be added first, reducing the viscosity before separately adding the additional formaldehyde component.

Thus, there are two methods of introducing the formaldehyde/solvent components to achieve the desired results. The first is to introduce them simultaneously and in conjunction with each other at the time of final use or application to fibrous materials.

This later mixture almost instantly and dramatically reduces the viscosity of the resin mixture while only slightly reducing its solids content. The dramatically reduced viscosity at once acts to enable the combination of the resin system with the fiber materials and even enables the addition of fillers, if desired, to make finished sheets or products of various configurations. No external heat is required to effect the cure of the product, which cures at ambient temperature, though heat may be used advantageously to accelerate the process of cure when that is desirable.

The second method of adding the solvent and later the additional formaldehyde component is to apply them sequentially, i.e., use the solvent at a point prior to final application or use to reduce viscosity, and the use of the added formaldehyde at the time of application to fibrous materials to effect cure. Both methods are discussed herein.

A novolac resin is formed by the initial steps of mixing the phenol, if used, resorcinol, and formaldehyde (whether actually formaldehyde or paraformaldehyde or a mixture) and pre-heating them to a point where minor deficiencies of formaldehyde prevent the resin from actually curing to completion. This is similar to what is done in my earlier U.S. Pat. No. 4,107,127, except that during this stage (the so-called "B" stage) in the present invention, the volatile solvents present are greatly reduced in amount, in order to produce high solids content novolac resin. The resin system at this stage may have a viscosity of 300 to 3,500 centipoises, and have about 64% to 83% of non-volatiles or solids. The resin system is alkaline and is based on the use of various inorganic hydroxides as catalysts. An important problem is how to add the formaldehyde needed in order to initiate the final cure desired, without having the added formaldehyde result in a viscosity that prevents the material from becoming workable.

A key feature of the invention is the use of a mixture or solution of formaldehyde, e.g., the one commonly known as Methyl Formcel which contains formaldehyde solids and a lower alcohol and achieves the further addition of formaldehyde needed to enable the final cure to begin, and at the same time, to reduce the viscosity of the total mixture. The mixture, when properly made, provides the necessary quantity of formaldehyde to enable the achievement of the necessary mol ratio for curing, and simultaneously, causes the viscosity to drop even with very little mixing. The mixture of the formaldehyde with the lower alcohol and perhaps an alkoxy composition is what achieves these phenomena. Liquid aqueous 37% formaldehyde would cause excessive and extreme viscosity reductions, making the mixture unusable for many applications.

One preferred form of one such mixture of formaldehyde and a lower alcohol is a mixture of about 55% liquid formaldehyde, about 35% methanol, and about 10% methoxymethanol. This mixture is sold commercially as "Methyl Formcel". Either Methyl Formcel or Methaform may be used, with equally beneficial results. A second such source of added formaldehyde is a mixture of around 55% liquid formaldehyde, 35% methanol, and 10% water, sold commercially as Methaform. Either Methyl Formcel or Methaform may be used at a rate of 10% to 19% of the novolac resin. A similar composition might be to use, to 100 part of the novolac resin, 11 parts of paraformaldehyde and 4 to 9 parts of methanol. In place of the methanol, with or without methoxymethanol, other lower alcohols and alkoxy compositions may be used, including ethanol, ethyloxyethanol, and butanol with an alkoxy butanol, but the mixtures thereof with formaldehyde are often not feasible. For example, a commercially available mixture of butanol with 35% formaldehyde content, the only butanol-formaldehyde mixture at present commercially available, not only has a repulsive smell, but also is too low in formaldehyde content, so that in order to achieve adequate HCHO addition a large amount must be used, causing excessive reduction in viscosity, similar to what results from use of 37% aqueous formaldehyde.

With the proper formaldehyde-lower alcohol mixture with either water or methoxymethanol included, the solids content of the resin is reduced only slightly—to about 62% or about 81%, from the original 64% to 83% range—while the viscosity is reduced from about the original 300 to 3500 c.p.s., to about 250 to 550 c.p.s. The methoxymethanol and methanol, or other such compositions, thus function as a powerful solvent for the phenol-resorcinol-formaldehyde premix while producing workable viscosities.

The ratios used are based on the weight of components. Typical ratios are about 10 to 19 parts-by-weight of the formaldehyde-methanol-methoxymethanol mixture to about 100 parts of the novolac resin of resorcinol and formaldehyde, or resorcinol, phenol, and formaldehyde. The formaldehyde-methanol-methoxymethanol mixture, not only completes the reaction, but enables the binder system to be easily applied to the fibers and also enables the addition of various fillers. The proper molar ratios enable ambient temperature cure of the product.

The second means of achieving the same result—i.e., first viscosity reduction to a desired level and then adding the formaldehyde component later, is to prepare a novolac premix of resorcinol formaldehyde or phenol-resorcinol-formaldehyde binder, and after the reaction of these materials to a point of developing a polymeric syrup slightly deficient in formaldehyde, i.e., a novolac with less than one mol ratio, thereafter add a solvent to reduce said high solids binder from a level of 300 to 3500 centipoises to 250 to 550 centipoises; and thereafter, at the time of final usage or application, adding the necessary additional formaldehyde to equal or exceed one mol ratio, which converts the novolac to a resole, thereby effecting cure. Both methods are illustrated in this specification.

SOME PREFERRED EMBODIMENTS OF THE INVENTION

Several kinds of products and various mixes of materials can be used. An overall description of the composition of the resin is as follows:

TABLE 1

| Workable Ranges of Components | |
|---|---|
| Ingredients | Parts by Weight |
| Part A (Novolac Resin) | |
| Resorcinol | 100–35 |
| Phenol | 0–40 |
| Formaldehyde | 15–35 |
| (or paraformaldehyde | |
| Catalyst*-solvent** | 20–115 |
| Solids content: | 64%–83% |
| Viscosity: | 300–3500 c.p.s. |
| Part B | |
| Formaldehyde | 7–11 |
| Paraformaldehyde | 5–12 |
| Lower alcohol*** | 4.6–6.7 |
| Alkoxy composition**** | 0–2 |
| Water | 0–2 |
| Solids content of mixture of parts A and B | 62%–81% |
| Viscosity of mixture of Parts A and B | 250–550 c.p.s. |

*inorganic hydroxide catalyst, e.g., sodium hydroxide, or, hydroxides of potassium, lithium calcium, magnesium, aluminum, etc.
**water and/or low-molecular weight alcohols
***e.g., methanol, ethanol, isopropanol, etc.
****e.g., methoxymethanol, etc.

Several kinds of products and various mixes of materials can be used. Some specific binders are shown in Table 2, some examples of the application of a few high solids resins as castings and also use with fiberglass is shown in Table 3, and further application with the making of fiberglass shapes is shown in Examples 1 through 8 below.

TABLE 2

Example of Two Typical Resins
Parts by Weight in Relation to 100 units of Resorcinol

| Part A | | |
|---|---|---|
| Percent actual solids | 71 | 64 |
| Ingredients | | |
| Resorcinol | 100 | 100 |
| Phenol | 70 | 70 |
| Formaldehyde solids | 30 | 30 |
| Catalyst or solvent(s) | 50 | 115 |
| Methanol | 0 | 4 |
| Viscosity range cps | 1500–3200 cps | 300–450 cps |
| Part B | | |
| Type | Liquid (1) | Powder (2) |
| Parts Formaldehyde Range (3) | 7–11 | 5–12 |
| Part C (4) | | |
| If lower alcohol only (5) | 4.6–6.7 | 4.6–6.7 |
| If mixture of lower alcohol and alkoxy or water | 4.6–8.6 | 4.6–8.6 |
| | At Time of Use | Prior to Use |
| Mixture of A&B and of C, when added Range | | |
| Percent solids | 68–69 | 61–62 |
| Viscosity cps | 250–500 cps | 350–550 cps |

(1) Solution of 55% formaldehyde, 35% methanol and 10% methoxymethanol or water.
(2) Powder paraformaldehyde, fine 95–97%.
(3) Additional formaldehyde solids required for ambient temperature cure based on 100 parts of part A liquid.
(4) Part C is methanol or other lower alcohol and methoxymethanol.
(5) Consists of methanol only.

TABLE 3

EXAMPLES OF CASTINGS AND FIBERGLASS
Using High Solids Binder (71% TABLE 2 as a Mix.)
All Quantities Shown Relate to 100 Parts of Part A
Used With Various Sources and Quantities
of Formaldehyde Solids.

| PART A | FORM-CEL | SOLID FORMAL-DEHYDE | MIX SOL-IDS | MAT | CAST-INGS |
|---|---|---|---|---|---|
| 100 | 10 | 5.5 | 69% | 1 ply 1–1.2 oz. no curl or cracks 11 days room temp. | NA |
| 100 | 13 | 7.15 | 69% | not released early - see above | OK at room temp. 12 days no cracks |
| 100 | 15 | 8¼ | 69% | NA | OK at room temp. 12 days |
| 100 | 17 | 9.35 | 69% | NA | Cracked at room temp. 2¼ hrs. |
| 100 | 19 | 10.5 | 69% | NA | See above 11 days |
| 100 | 11 para | 10.5 | 73% | curled and cracked | NA |

TABLE 4

Example of Viscosity Reduction with Formcel
Viscosity Comparison of Various Binder Mixes and Influence of Methyl Formcel on Depression of Viscosity

| Solids Part A TABLE 2 | Viscosity Part A Only[1] | Parts Filler Added | Parts Formcel Added[2] | Viscosity of Mix[1] | Comments |
|---|---|---|---|---|---|
| 64% | 225 | — | — | NA | Standard in Commercial use - See U.S. Pat. No. 4,107,127 |
| 71% | 3170 | — | — | NA | High solids binder |
| 71% | 3170 | — | 14 | 320 | A dramatic drop in viscosity |
| 71% | 3170 | 4 | 14 | 335 | A dramatic drop in viscosity |
| 71% | 3170 | 8 | 14 | 320 | A dramatic drop in viscosity |

Part A shows binder type. Basis is 100 parts by weight of part A.
Filler and Formcel parts are by weight in relation to 100 parts of Part A.
[1]Viscosity determined by viscometer similar to Ford 3; for comparison purposes only, in cps.
[2]As Methyl Formcel. Parts based on weight Part A plus weight of filler.

TABLE 5

Example of Viscosity Reduction with Formalin
Viscosity Comparison of Various Binder Mixes and Influence of 37% Formalin on Depression of Viscosity

| Solids Part A TABLE 2[1] | Viscosity Part A Only[2] | Parts Formalin Added[3] | Viscosity of Mix[2] | Comment |
|---|---|---|---|---|
| 64% | 225 | 19 | 37 | Uncured (rubbery) after 24 hours |
| 64% | 225 | 28 | 30 | Uncured (rubbery) after 24 hours |
| 71% | 3170 | 19 | 270 | Uncured (rubbery) after 24 hours |
| 71% | 3170 | 28 | 90 | Cured hard after 24 hours |

[1]Part A binder type. Basis is 100 parts by weight Part A.
[2]Viscosity determined by viscometer similar to Ford 3; for comparison only, in cps.
[3]Parts of 37% formalin by weight in relation to 100 parts of Part A.

EXAMPLE 1

A flat sheet of reinforced resin of 64% solids Part A was made according to the present invention, as shown in Table 2 above.

Alternate layers of random fiber glass mat and glass woven roving were saturated with the resin resulting from mixture of 100 parts by weight of Part A and 10 parts Part B to a thickness of about ⅜ inch. This material was then allowed to cure at ambient temperature and was cut into sections. The panels were sent to Factory Mutual Engineering in Norwood, Mass., where tests were conducted according to ASTM E-84 protocol. Both flame spread and smoke development ratings were each 5. These are well within the limits of most building standards which specify flame spreads of less than 25 and smoke development of less than 50, and compare most favorably with alternate systems whose flame ratings may be as much as 200 and smoke development of 1500.

EXAMPLE 2

Various materials based on glass fibers were combined with the 64% solids resin mixture shown in Table 2 with a ratio of 100 parts of Part A and 12 parts of Part B.

A layer of chemical resistive grade glass veil (known usually as "C" glass veil) were saturated with the resin mix. Two layers of polyester veil are each saturated with the resin mixture, and then a single layer of random glass mat was saturated with the mixture. The combination of these layers was them formed into a 12" duct, which was about 25' long and ¼" thick. A batch of the resin mixture was put into a suitable container known as a tub or a bath, through which 32 strands of glass fiber filament winding roving were drawn and were then gathered into a narrow band. The band was applied both circumferentially and helically on top of the prior glass materials, until all of the surfaces were thoroughly covered with the resin, incorporating the filament-wound glass fibers thereafter, a thin woven roving of glass fiber, commonly known as boat cloth, was placed over the filament winding, and then a final layer of resin saturated "C" glass veil was applied.

During the process it was noted that each of the material was easily saturated with the resin mixture and that there was no problem in pulling the 32 strands of filament through the resin bath and of winding it on the duct. The resultant product was then allowed to cure at room temperature, and the part was taken out of the mold at that time. The result was a duct of great structural strength and rigidity.

Efforts were made to burn the completed pipe, using both propane and oxyacetylene torches, but no burning at all took place; it simply would not catch on fire. It was then shipped to Factory Mutual's Fire Research Test Laboratory in West Gloucester, R.I., where it was tested for flame resistance under their test standard #4922. A fire of fifteen minutes duration was drawn into the duct, so that temperatures rose to 1800° F. to 1950° F.; the fire did not progress along the duct.

EXAMPLE 3

A rectangular mold was created in order to make a rectangular duct with walls about ¼" thick. The duct was 46"×36"×9½' long. The same fiber materials were used as in Example 2. All parts were coated with the resin mixture of 100 parts of 71% solids Part A and 13 parts of liquid Part B (See TABLE 2). The duct was then cured at room temperature for eight hours and was subsequently taken off the mold. This part was a commercially viable part, and showed great strength and rigidity. In fact, one can stand on such part without any deformation of the flat walls. Again, the material could not be set on fire by application of either a propane or oxyacetylene torch.

EXAMPLE 4

A 90° elbow which was 12" diameter with walls ⅜" thick was constructed, combining the same resin mixture as cited in Example 3 above, except that 15 parts of Part B were used per 100 parts of Part A, and some of the fiber materials, except that no final layer of boat cloth and no final layer of "C" glass veil were used. The part was cured at room temperature, and again a rigid commercially viable part was made, which did not burn when tested with either the oxyacetylene torch or the propane torch.

EXAMPLE 5

A transition fitting, going from one rectangular shape to another, was made in this example. At one end the part was 36"×16" and at the other end it was 32"×24". The whole part was 2' long. The same resin mixture as in Example 4 was used, in combination with various layers and sequences of glass fiber materials. These were (1) a single layer of "C" glass veil, (2) two layers of polyester veil, and (3) alternate layers of random glass fiber mat, there being four such layers in total, interlayered with glass woven roving, of which there were three layers all together. This part was then allowed to cure at ambient temperature for six hours. Again a substantial part was achieved which was rigid and which would not burn even on the application of the propane and oxyacetylene torches thereto.

EXAMPLE 6

A 14" round duct 20 feet long and ¼" thick was made as follows: The initial layer of C glass veil, polyester veils and random glass mat were saturated with resin as used in Example 2 except 13 parts of Part B were used: subsequent layers of filament winding, boat cloth and exterior C glass veil were saturated with resin using 64% solids resin with 10 parts of paraformaldehyde to 100 parts of Part A as shown in Example 2. The part was stripped from the mold after curing. An oxyacetylene torch was applied to the part; it would not start on fire nor was any smoke visible.

EXAMPLE 7

A flat sheet part was made with 100 parts 71% solids Part A from TABLE 2, substituting 19 parts of 37% aqueous formaldehyde for the Part B component, this being the only source of added formaldehyde. The mix was depressed in viscosity for saturation but the part did not cure when using an equivalent weight of HCHO as used in the above examples. (See TABLE 5.)

EXAMPLE 8

Flat laminates were made from "C" glass veil, random glass mat and glass woven roving to ¼" thickness. The resin mixture was made as described above in Examples 4 and 5 (71% solids) but consisted of 100 parts by weight of Part A and 16 parts by weight of Part B. The fiber parts were all saturated with the resins, and application was made similarly to Example 1. The parts were then allowed to cure at room temperature and were cut and trimmed and sent to the fire Research Laboratory of Factory Mutual Engineering at Norwood, Mass. for flammability testing. This laboratory previously tested the material resulting form the practice of U.S. Pat. No. 4,107,127. The laboratory made a parallel plate fire test and could find no difference from tests they had done before on similar laminated tested under that patent. The opinion of the laboratory was reported as being that the panels had equivalent fire resistance and low smoke evolution.

EXAMPLE 9

An 84" diameter by 10 feet long by ⅜" duct section was made similar to that described in Example 2, except the resin system used consisted of the 71% solids resin (Part A) shown in Table 2 with Parts B and C consisting of Methyl Formcel as previously described being 55% formaldehyde, 35% methanol and 10% methoxy methanol. The part cured at ambient temperature and was very rigid when removed from the mold.

EXAMPLE 10

A part 84" in diameter by 10 feet long by ⅜" thick was made as described in Example 9, except Parts B and C were Methaform, consisting of 55% formaldehyde, 35% methanol and 10% water. It was cured at room temperature and was equally rigid and as commercially viable as Example 9.

EXAMPLE 11

An 84" diameter by 10 feet long by ⅜" thick duct section was made. The resin mix was 100 parts of 71% solids Part A of Table 2, 15 parts of liquid parts B and C, using Methyl Formcel. A layer of chemical resistive grade glass veil (known usually as "C" glass veil) was saturated with the resin mix. Two layers of polyester veil are each saturated with the resin mixture, and then a single layer of random glass mat was saturated with the mixture. A batch of the resin mixture was put into a suitable container known as a tub or a bath, through which 32 strands of glass fiber filament winding roving were drawn and were then gathered into a narrow band. The band was applied both circumferentially and helically on top of the prior glass materials, until all of the surfaces were thoroughly covered with the resin, incorporating the filament-wound glass fibers. Thereafter, a thin woven roving of glass fiber, commonly known as boat cloth, was placed over the filament winding, and then a final layer of resin saturated "C" glass veil was applied.

During the process it was noted that each of the materials was easily saturated with the resin mixture and that there was no problem in pulling the 32 strands of filament through the resin bath and of winding it on the duct. The resultant product was then allowed to cure at room temperature, and the part was taken out of the mold at that time. The result was a duct of great structural strength and rigidity.

After the 84"×10'×⅜" part was demolded a 54" diameter 90-degree conical tap tapering at the intersection to 7¼ feet wide was applied to the 84" diameter duct. The resin used was the 64% solids material of Table 2. The part A was exactly as shown in Table 2. Part B was 10 parts paraformaldehyde. The resultant resin mixture was used to saturate random glass mat to bond the tap to the main.

When cured, the finished product was rigid and commercially viable. A propane torch was applied to cutouts from the duct, and they did not burn or smoke.

EXAMPLE 12

Example 11 was repeated up to the demolding and the bonding of the 54" conical tap. At that stage, the resin used was the same as that used to make the 84" product, using Methyl Formcel. The results were the same as those described in Example 11.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A lightweight, fire-resistive, reinforced structural material exhibiting low flame spread, good heat release and low smoke evolution when exposed to direct flame or to radiant heat and being resistant to embrittlement and cracking upon curing, comprising:
   (1) a fire-resistive, reinforcing material, embedded in a fire resistive resin,
   (2) said fire-resistive resin comprising the cured reaction product of:
      (a) a solvent-carried hydroxyl-group component selected from the group consisting of resorcinol and a mixture of resorcinol and phenol containing not over 2 mols phenol per mol resorcinol, and
      (b) a solvent-carried first aldehyde component providing a molar ratio of less than one mol of aldehyde per one mol of said component (a),
      said (a) and (b) being premixed to provide a novolac resin in solvent with a shelf life of about 6 months at a solids content of about 64% to 83% of the total resin weight and at a viscosity of about 300 to 3500 cps,
      (c) the resin viscosity of the premixed (a) and (b) been reduced to about 250 to 550 c.p.s. by the addition of an organic viscosity-reducing solvent for said novolac resin wherein the solids content is reduced to about 62% to 81% of the total resin weight, and
      (d) a second aldehyde component being added to bring the molar ratio of total aldehyde to one or more mols aldehyde per mol of component (a), aldehyde solids being present in said second aldehyde component in an amount of from 5% to 12% by weight of said components (a) and (b),
   (3) said solvent being removed the embedded material of (1) and (2) being thermoset cured at ambient temperatures.

2. The reinforced structural material of claim 1 wherein said viscosity reducing solvent and said second aldehyde compound are added simultaneously before adding ingredients (a) and (b).

3. The reinforced structural material of claim 1 wherein said ingredient (c) is added to ingredients (a) and (b) before (d) is added separately.

4. The reinforced structural material as in claim 1 wherein said reinforcing material is glass fibers.

5. The reinforced structural material as in claim 1 wherein said reinforcing material is graphite fibers.

6. The reinforced structural material as in claim 1 wherein said reinforcing material comprises a layer of fiberglass woven roving disposed between two layers of fiberglass mat, said reinforcing material being laminated with said resin.

7. The reinforced structural material of claim 1 wherein said viscosity-reducing solvent is a mixture of methanol and methoxymethanol.

8. The reinforced structural material of claim 1 wherein said viscosity-reducing solvent is a mixture of methanol and water.

9. A lightweight, fire-resistive, reinforced structural material exhibiting low flame spread, good heat release and low smoke evolution when exposed to direct flame or to radiant heat and being resistant to embrittlement and cracking upon curing, comprising:
   (1) a fire-resistive, reinforcing material comprising fibers of glass or carbon embedded in a fire resistive resin,
   (2) said fire-resistive resin comprising the reaction product of:
      (a) a hydroxyl-group component selected from the group consisting of resorcinol and a mixture of resorcinol and phenol containing not over 2 mols phenol per mol resorcinol, carried in a solvent, and
      (b) a first aldehyde component providing a molar ratio of less than one mol of aldehyde per mol of said component (a),
   said (a) and (b) being premixed to provide a novolac resin having a solids content of about 64% to 83% by weight, a viscosity of about 300-3500 c.p.s. and a shelf life of about six months,
      (c) an organic solvent for said novolac resin being added to the premixed (a) and (b) thereby reducing the viscosity to about 250-500 c.p.s., and
      (d) a second aldehyde component being added to bring the molar ratio of total aldehyde to one or more mols aldehyde per mol component (a) aldehyde solids being present in said second aldehyde component in an amount of from 5% to 12% by weight of the total of said components (a) and (b), the solids content is reduced to about 62% to 81% of the total resin weight,
   said resin from (d) being added to embed said reinforcing material being thermoset cured therein and the embedded material at ambient temperatures.

10. The reinforced structural material of claim 9 wherein said viscosity reducing solvent and said second aldehyde compound are added simultaneously before adding ingredients (a) and (b).

11. The reinforced structural material of claim 9 wherein said ingredient (c) is added to ingredients (a) and (b) before (d) is added separately.

12. The reinforced structural material as in claim 9 wherein said reinforcing material is glass fiber cloth.

13. The structural material as in claim 9 wherein said reinforcing material is graphite fiber cloth.

14. The reinforced structural material as in claim 9 wherein said organic solvent is a mixture of methanol and methoxymethanol.

15. A method of making a reinforced, fire-resistive, resinous structural material exhibiting low flame spread, good heat release and low smoke evolution when exposed to direct flame or to radiant heat and being resistant to embrittlement and cracking upon curing, comprising
   (1) preparing a novolac resin-composition consisting essentially of
      (a) a hydroxyl-group component selected from the group consisting of resorcinol and a mixture of resorcinol and phenol containing not over 2 mols phenol per one mol resorcinol,
      (b) a first aldehyde component providing a molar ratio of less than one mol of aldehyde per mol of said component (a), to produce a novolac resin therewith, having a solids content by weight of about 64-83% and a viscosity of about 300-3000 centipoises,
   (2) Adding to said novolac resin a
      (c) a viscosity-reducing solvent for reducing the viscosity of the mixture of (a), (b), and (c) to a viscosity between 250 and 550 cps, and
      (d) a second aldehyde component to bring the molar ratio of aldehyde to one or more mols aldehyde per mol of component (a), aldehyde solids being present in said second aldehyde component in an amount of from 5% to 12% by weight of the total of said components (a) and (b), without reducing said solids content of (b) by more than about 3%,
   (3) saturating a substantially non-flammable fibrous reinforcement material with the material resulting from step (2),
   (4) pressing said saturated fibrous reinforcing material to remove air and excess resinous composition, and
   (5) curing said resin remaining in said saturated fibrous reinforcing material, at from room temperature to about 105° C., to form said structural material.

16. The method of claim 15 comprising adding ingredient (c) to (a) and (b) simultaneously while adding (d).

17. The method of claim 15 comprising adding ingredient (c) to ingredients (a) and (b) before and separately from ingredient (d).

18. The method of claim 15 wherein said viscosity-reducing solvent is a mixture of methanol and methoxymethanol.

19. The method of claim 15 wherein said viscosity-reducing solvent is a mixture of methanol and water.

20. The method of claim 15 comprising between steps (4) and (5) forming said saturated fibrous reinforcing material into a tubular shape.

21. A lightweight, fire-resistive, reinforced structural material exhibiting low flame spread, good heat release and low smoke evolution when exposed to direct flame or to radiant heat and being resistant to embrittlement and cracking upon curing, comprising:
   (1) a fire-resistive reinforcing material embedded in a fire resistive resin,
   (2) said fire-resistive resin comprising the reaction product of:
      (a) a solvent-carried hydroxyl-group component selected from the group consisting of resorcinol and a mixture of resorcinol and phenol containing not over 2 mols phenol per mol resorcinol,
      (b) a solvent-carried first aldehyde component providing a molar ratio of less than one mol of aldehyde per mols of said component (a),
   said (a) and (b) being premixed to provide a novolac resin in solvent at a solids content of about 64% to about 83% by weight and at a viscosity of about 1500 to about 3500 cps,
      (c) the viscosity of said novolac resin being reduced to about 150 to about 550 cps by the addition of an organic viscosity-reducing solvent for said novolac resin wherein the solids content is reduced by about 3% to a range of about 62% to about 81% by weight, and
      (d) a second aldehyde component being added to bring the molar ratio of total aldehyde to one or more mols aldehyde per mol component (a), aldehyde solids being present in said second aldehyde component in an amount of from about 5% to about 12% by weight of said components (a) and (b), (3) said solvent being removed and the embedded material from (1) and (2) being subjected to thermoset curing.

22. A lightweight, fire-resistive, reinforced structural material exhibiting low flame spread, good heat release and low smoke evolution when exposed to direct flame or to radiant heat and being resistant to embrittlement and cracking upon curing, comprising:
  (1) a fire-resistive, reinforcing material comprising fibers of glass or carbon embedded in a fire resistive resin,
  (2) said fire-resistive resin comprising the reaction product of:
    (a) a hydroxyl-group component selected from the group consisting of resorcinol and a mixture of resorcinol and phenol, carried in a solvent, and
    (b) a first aldehyde component providing a molar ratio of less than one mol of aldehyde per mol of said component (a),
  (a) and (b) being mixed to provide a novolac resin of about 64% to about 83% by weight and at a viscosity of about 1500 to about 3500 cps,
    (c) an organic solvent for said novolac resin being added to the mixed (a) and (b) thereby reducing the viscosity of said resin to about 250 to about 550 cps, and
    (d) a second aldehyde component being added to bring the molar ratio of total aldehyde to one or more mols aldehyde per mol of component (a) aldehyde solids in said second aldehyde component being present in an amount of from about 5% to about 12% by weight of said components (1) and (2), while reducing the solids content about 3% to about 62% to about 81%
  said resin from (d) being added to embed said reinforcing material therein and curing the embedded reinforced material being cured.

23. A method of making a reinforced, fire-resistive, resinous structural material exhibiting low flame spread, good heat release and low smoke evolution when exposed to direct flame or to radiant heat and being resistant to embrittlement and cracking upon curing, comprising:
  (a) preparing a novolac resin-composition consisting essentially of
    (1) a hydroxy-group component chosen from the group consisting of resorcinol and a mixture of resorcinol and phenol containing not over 2 mols phenol per 1 mol resorcinol,
    (2) a first aldehyde component providing enough aldehyde with respect to said component (1) to produce a novolac resin therewith having a solids content of about 64% to about 83% and a viscosity of about 1500 to about 3500 cps,
  (b) adding to said novolac resin
    (3) a viscosity reducing solvent for said novolac resin, and
    (4) a second aldehyde component aldehyde solids being present in said second aldehyde component in an amount of from about 5% to about 12% by weight of the total of said components (1) and (2) to provide a viscosity of from about 250 to about 550 cps and solids reduction of up to about 3% to about 62% to about 81% solids,
  (c) saturating a substantially non-flammable fibrous reinforcement material with the material resulting from step (b),
  (d) pressing said saturated fibrous reinforcing material to remove air and excess resinous composition, and
  (e) curing said resin remaining in said saturated fibrous reinforcing material, at from room temperature to about 105 degrees C. to form said structural material.

24. An ambient temperature, thermoset curable composite comprising
  (1) a fire-resistive, reinforcing material embedded in a fire resistive resin composition,
  (2) said fire-resistive resin composition comprising the cured reaction product of:
    (a) a solvent-carried hydroxyl-group component selected from the group consisting of resorcinol and a mixture of resorcinol and phenol containing not over 2 mols phenol per mol resorcinol, and
    (b) a solvent-carried first aldehyde component providing a molar ratio of less than one mol of aldehyde per mol of said component (a)
  said (a) and (b) being premixed to provide a novolac resin in solvent with a shelf life of about 6 months at a solids content of about 64% to 83% of the total resin weight and at a viscosity of about 300 to 3500 cps,
    (c) the resin viscosity of the premixed (a) and (b) being reduced to about 250 to 550 c.p.s. by the addition of an organic-viscosity-reducing solvent for said novolac resin wherein the solids content is reduced to about 62% to 81% of the total resin weight, and
    (d) a second aldehyde component being added to bring the molar ratio of total aldehyde to one or more mols aldehyde per mol component (a), aldehyde solids being present in said second aldehyde component in an amount of from 5% to 12% by weight of said components (a) and (b),
  (3) whereby said fire-resistive reinforcing material of (1) embedded with said fire resistive resin of (2) is thermoset curable at ambient temperatures.

25. The composite as in claim 24 wherein said reinforcing material is glass fibers.

26. The composite as in claim 24 wherein said reinforcing material is graphite fibers.

27. The composite as in claim 24 wherein said reinforcing material comprises a layer of fiberglass woven roving disposed between two layers of fiberglass mat, said reinforcing material being laminated with said resin.

28. The composite of claim 24 wherein said viscosity-reducing solvent is a mixture of methanol and methoxymethanol.

29. The composite of claim 24 wherein said viscosity-reducing solvent is a mixture of methanol and water.

30. An ambient temperature, thermoset curable composite comprising
  (1) a fire resistive, reinforcing material embedded in a fire resistive resin,
  (2) said fire-resistive resin composition comprising the reaction product of:
    (a) a solvent containing novolac resin composition comprising a hydroxyl group component selected from the group consisting of a resorcinol and a mixture of resorcinol and phenol containing not over 2 mols phenol per mol resorcinol mixed with a first aldehyde component providing a molar ratio of less than one mol aldehyde per mol of said hydroxyl group component, said composition having a solids content of about 64% to 83% of total resin weight and a viscosity of about 300 to 3500 c.p.s., (b) an organic, viscosity-reducing solvent for said novolac resin being added wherein the solids content is reduced to about 62% to 81% of total resin weight and to a viscosity of about 250 to 550 c.p.s, (c) a second aldehyde component being added to bring the molar ratio of the total aldehyde to one or more mols aldehye per mol of said hydroxyl group component, aldehyde solids being present in said second aldehyde component in an amount of about 5% to 12% by weight of said composition (a), (3) whereby said fire-resistive reinforcing material of (1) embedded with said fire resistive composition of (2) is thermoset curable at ambient temperatures.

31. The composite as in claim 29 wherein said reinforcing material is glass fibers.

32. The composite as in claim 29 wherein said reinforcing material is graphite fibers.

33. The composite as in claim 29 wherein said reinforcing material comprises a layer of fiberglass woven roving disposed between two layers of fiberglass material, said reinforcing material being laminated with said resin.

34. The composite of claim 29 wherein said viscosity-reducing solvent is a mixture of methanol and methoxymethanol.

35. The composite of claim 29 wherein said viscosity-reducing solvent is a mixture of methanol and water.

* * * * *